US008931069B2

(12) United States Patent
Hird

(10) Patent No.: US 8,931,069 B2
(45) Date of Patent: Jan. 6, 2015

(54) AUTHENTICATION WITH MASSIVELY PRE-GENERATED ONE-TIME PASSWORDS

(75) Inventor: Geoffrey Hird, Cupertino, CA (US)

(73) Assignee: CA, Inc., New York, NY (US)

( * ) Notice: Subject to any disclaimer, the term of this patent is extended or adjusted under 35 U.S.C. 154(b) by 180 days.

(21) Appl. No.: 13/043,860

(22) Filed: Mar. 9, 2011

(65) Prior Publication Data

US 2012/0233675 A1    Sep. 13, 2012

(51) Int. Cl.
*G06F 7/04*       (2006.01)
*G06F 15/16*      (2006.01)
*G06F 17/30*      (2006.01)
*H04L 29/06*      (2006.01)

(52) U.S. Cl.
USPC .............................................. 726/6; 709/203

(58) Field of Classification Search
USPC .............. 713/155, 159, 168, 183, 193; 726/6; 709/203
See application file for complete search history.

(56) References Cited

U.S. PATENT DOCUMENTS

| 6,170,058 | B1 * | 1/2001 | Kausik ........................... 713/193 |
| 8,412,928 | B1 * | 4/2013 | Bowness ........................ 713/155 |
| 2007/0061865 | A1 * | 3/2007 | Bermudez et al. ................ 726/2 |
| 2008/0228772 | A1 * | 9/2008 | Plamondon ...................... 707/10 |
| 2008/0270791 | A1 * | 10/2008 | Nystrom et al. ............... 713/159 |
| 2008/0276098 | A1 * | 11/2008 | Florencio et al. ............. 713/183 |
| 2009/0097459 | A1 * | 4/2009 | Jendbro et al. ................ 370/338 |
| 2009/0106138 | A1 * | 4/2009 | Smith et al. ..................... 705/35 |
| 2011/0113245 | A1 * | 5/2011 | Varadarajan ................... 713/168 |
| 2011/0289576 | A1 * | 11/2011 | Cheng ............................... 726/9 |
| 2012/0260324 | A1 * | 10/2012 | Lenon et al. ....................... 726/6 |

* cited by examiner

*Primary Examiner* — Dustin Nguyen
(74) *Attorney, Agent, or Firm* — Vierra Magen Marcus LLP

(57) ABSTRACT

Embodiments of the invention provide systems and methods for the storage of One-Time Passwords (OTPs) on a device (principal) that needs to authenticate from time to time. It utilizes recent availability of data storage capacity not previously exploited in this arena. Also disclosed is the means to initialize and modify the system (all principals) in a secure manner, and the means to store the OTP production means on a device in a secure manner, even if the device has no built-in protected storage.

25 Claims, 5 Drawing Sheets

AUTHENTICATION WITH MASSIVELY PRE-GENERATED ONE-TIME PASSWORDS

BACKGROUND OF THE INVENTION

Embodiments of the present invention relate generally to methods and systems for utilizing one-time passwords and more particularly to methods and systems for providing and using extensive lists of pre-generated one-time passwords.

Authentication using a static password has been a staple of computer and other interactions between (typically two) "principals" for decades, if not millennia. Static passwords are initialized, used multiple times, and changed occasionally. In recent decades, One-Time Passwords (OTPs) have been used. To utilize an OTP, two principals are initialized with the same seed value and an algorithm for generating a sequence of passwords, each password different and pseudo-random. Input to the algorithm, in addition to the seed, can be a counter or a time value, resulting in "event-based" or "time-based" OTPs. The identical sequence of OTPs is generated in synchrony by each principal and thus can be used for password authentication, where a given OTP is used at most once. OTPs have the advantage over static passwords that if intercepted by an attacker, they cannot be used by the attacker except possibly once.

OTPs can be used in a variety of settings. A principal needing to access a protected resource via a first channel may be sent an OTP via a second channel, which the principal must then transmit via the first channel. Another example occurs within a computer case: after a computer is booted up, a hard drive may send an OTP to be stored in the BIOS. Next time the computer is started, the BIOS must present the OTP to the hard drive before the hard drive will allow access. However, these approaches have shortcomings. For example, these methods might require non-trivial processing by both principals that may not be available on all devices, or rely on one or a few OTPs stored locally that may be subject to loss or corruption. Also, in order to support OTP generation on multiple platforms, vendors must maintain multiple platform-dependent implementations. Furthermore, cryptographic generation algorithms are in principle vulnerable to attack by an adversary with unlimited resources. Moreover, no currently known algorithm (HOTP, TOTP, 3DES, AES, SHA family, RSA, etc.) has been proved to be secure against cryptanalysis, and hence any of them may potentially be broken more easily than by a brute-force attack. Hence there is a need in the art for improved methods and systems for utilizing one-time passwords.

BRIEF SUMMARY OF THE INVENTION

Embodiments of the invention provide systems and methods for the storage of OTPs on a device (principal) that needs to authenticate from time to time. It utilizes recent availability of data storage capacity not previously exploited in this arena. Also disclosed is the means to initialize and modify the system (all principals) in a secure manner, and the means to store the OTP production means on a device in a secure manner, even if the device has no built-in protected storage.

According to one embodiment, a system for utilizing pre-generated one-time passwords can comprise a password server and a client device. The password server can execute one or more applications which cause the password server to generate a list of One-Time Passwords (OTPs) comprising multiple OTPs and package the list of OTPs for delivery. The client device can comprise a memory. The password server can download the list of OTPs to the client device in response to a request. The client device can in turn save the downloaded list of OTPs to the memory of the client device for use in accessing a resource requiring authentication.

For example, the client device can include a client application stored in the memory of the client device. The client application, when executed by a processor, can cause the processor to select one of the OTPs from the list of OTPs in the memory of the client device for use in accessing the resource requiring authentication. In some cases, the client device can further comprise a processor. In such cases, the processor of the client device can execute the client application. The client device can be, for example, a mobile phone, a fob device, and a smart card, etc. In other cases, the client device can comprise a removable memory device and a computer system adapted to read the client application from the removable memory device and execute the client application.

The size of the list of OTPs can be of any size manageable and practical for client, server, and the whole system. For example, a human user with a desktop computer, tablet, or mp3 player frequently downloads songs with a typical size of 5 megabytes in a matter of seconds. In storage, network, and time requirements, thus an OTP list of 5 MB is very practical. Other examples are a video clip (approximately 35 megabytes) or a movie (approximately 800 megabytes). Thus, the OTP list size can be as large as is feasible at the time of list creation. There are other ways of characterizing the largeness of the OTP lists. Additionally or alternatively, the size of the list of OTPs can be based on a speed of a network connection of the client device. In such cases, the size of the list of OTPs can further depend upon a predetermined amount of time needed to download the list of OTPs at the speed of the network connection. Other variations are contemplated and described herein.

DETAILED DESCRIPTION OF THE INVENTION

Figure 1:
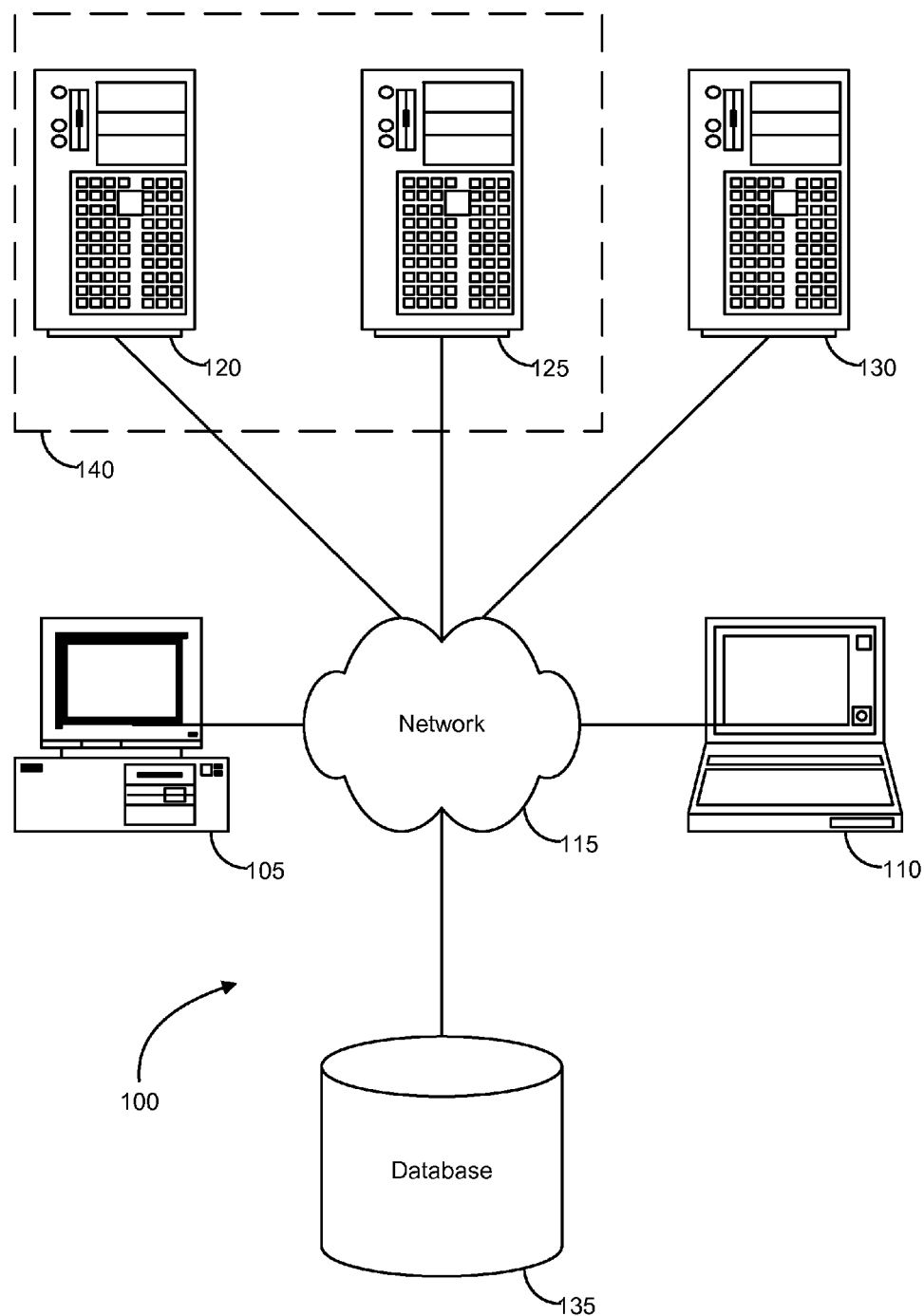
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for the storage of OTPs on a device (principal) that needs to authenticate from time to time. It utilizes recent availability of data storage capacity not previously exploited in this arena. Also disclosed is the means to initialize and modify the system (all principals) in a secure manner, and the means to store the OTP production means on a device in a secure manner, even if the device has no built-in protected storage.

Rather than use the abstract terminology of authentication research, like "principal", we will mostly use words like "device" or "client" or "client device" for the principal needing to authenticate, and "server" or "service" for a principal or its agent controlling access to some protected resource, to keep the discussion concrete and simple. But it is to be understood that a "device" might range from a true device like a mobile phone or a fob on a keychain, to a piece of software running on a desktop computer, or even a distributed application running across several computers. And rather than a simple client-server interaction, the whole discussion applies, "mutatis mutandis" to general principal-principal interactions, including those involving more than two principals authenticating to each other.

Generally speaking, embodiments of the present invention include a password server that can generate and provide to a client device an OTP list containing a large number of OTPs but without the seed value for generating such passwords. That is, the OPT password list can include a large number of pre-generated OTPs ready for use by the client device. The client device can in turn receive and store this OTP list for use when accessing a service or resource. For example, the client device can select an OTP from the OTP list based on a counter, a current time, etc. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents just as the aforementioned user computers. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
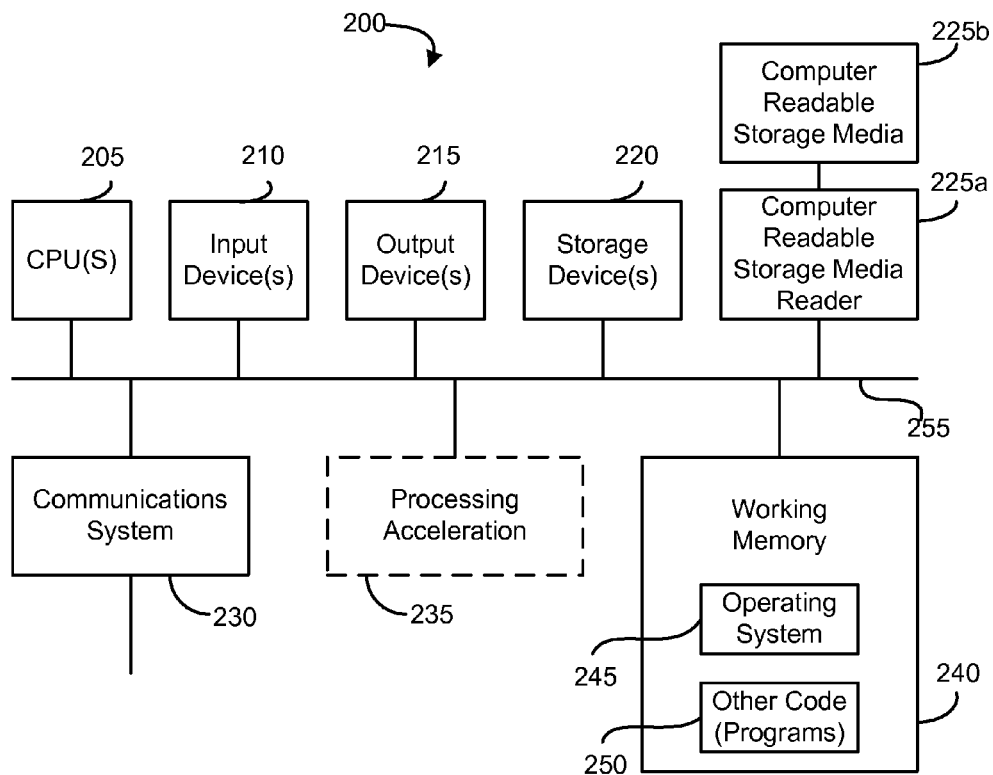
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
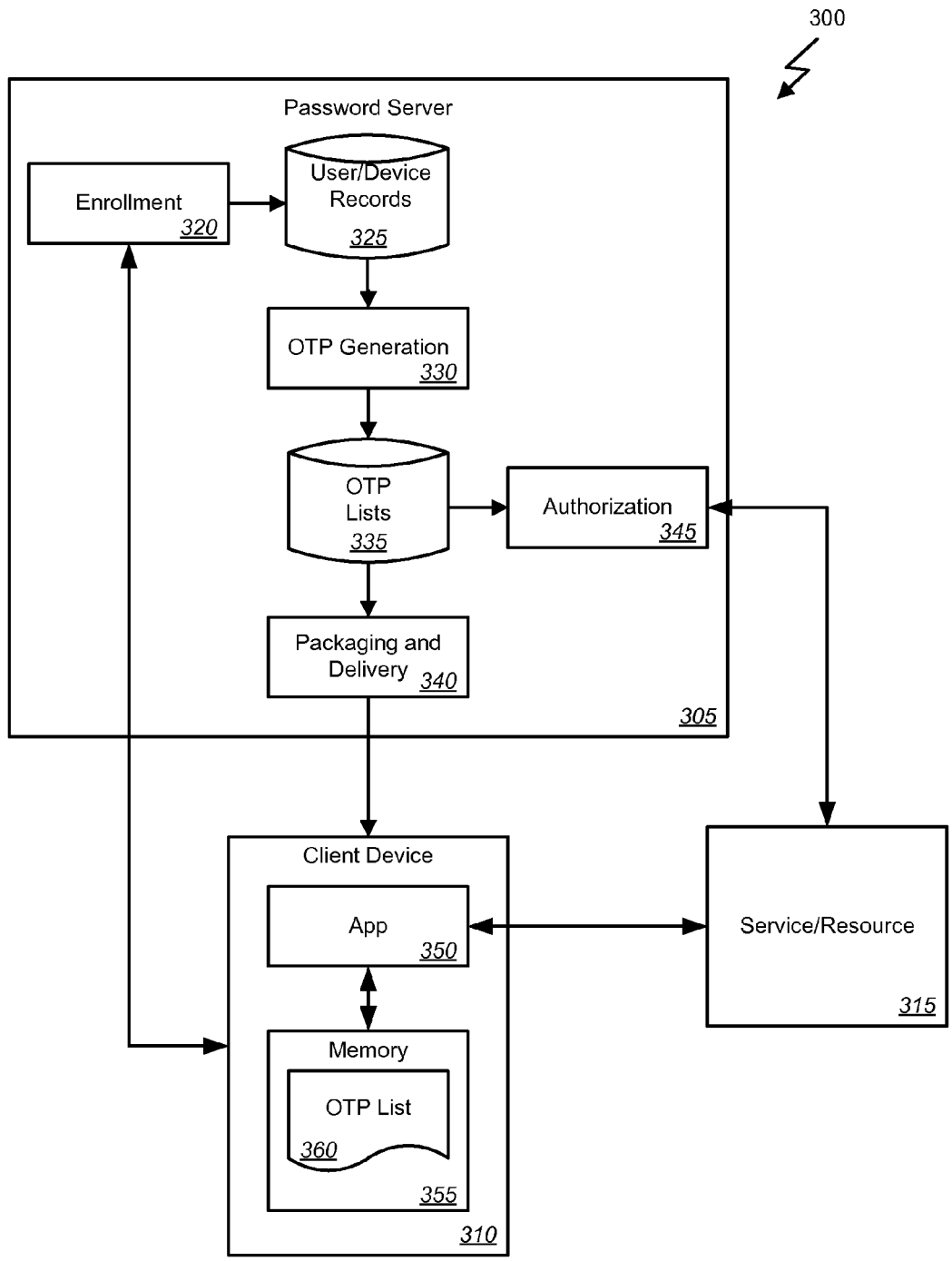
FIG. 3 is a block diagram illustrating, at a high-level, functional components of a system for utilizing pre-generated one-time passwords according to one embodiment of the present invention.

FIG. 3 is a block diagram illustrating, at a high-level, functional components of a system for utilizing pre-generated one-time passwords according to one embodiment of the present invention. In this example, the system 300 includes a password server 305, a client device 310, and a service or resource 315. The password server 305, client device 310, and service or resource 315 can be communicatively coupled with one another via one or more communications networks (not shown here) such as the Internet, a wired or wireless network including but not limited to a cellular or other mobile communications network, and/or another local or wide area network as described above. Generally speaking, the password server 305 can generate and provide to the client device 310 an OTP list containing a large number of OTPs but without the seed value for generating such passwords. That is, the OTP list can include a large number of pre-generated OTPs ready for use by the client device 310. The client device 310 can in turn receive and store this OTP list 360 in local memory 355 for use when accessing the service or resource 315. For example, the client device 310 can select an OTP from the OTP list 360 based on a counter, a current time, etc.

More specifically, the password server 305 can include an enrollment module 320 which can collect identifying information for the user of the client device 310 and/or the client device itself. This information can be collected through the client device 310 or another device (not shown here) communicatively coupled with the password server 305 such as a personal computer or other system. The enrollment module 320 can use this information to generate and save one or more user and/or device records 325 uniquely identifying the enrolled client device 310.

Once enrolled, an OTP generation module 330 of the password server 305 can use the user and/or device records to generate an OTP list for the client device 310. This generation in advance is also referred to herein as "pre-generation." This OTP list can be saved in a set of records 335 by the password server 305. For example, the OTP generation module can comprise an event-based OTP application that utilizes a seed and counter, e.g., in the user or device records 325, the latter being updated after each OTP generation.

According to one embodiment, a time-based OTP application contains a seed and uses a sequence of future time values (or a varying datum that corresponds in some way to future time values) to generate its OTP list. When the client, in the future (possibly a year from now), needs to choose an OTP from its list, and submit it, the client can determine the current time (to within a drift window). Using either an explicit mapping from the time to the list, or an offset calculation based on the elapsed time since an agreed starting point, the client can select the appropriate OTP from the list and submit it. According to one embodiment, the client can regularly select the next OTP from the list and displays it, or otherwise makes it available, to the user, without the need for initiating action on the part of the user.

The server can provide the OTP list for the client, but in order to check an OTP later, the authentication server could either use a copy of that list, or store the seed and regenerate as needed. Many variant OTP algorithms are of course possible. For example, instead of a seed and a hash-based mechanism, some algorithms use a stored encryption key and an encryption-based mechanism. Again, instead of a seed, some systems such as EMV use a master secret/key plus the userid to generate a user secret/key/seed. While this description focuses on the "generation" of OTPs from a seed, embodiments of the present invention can also include the case where the OTP list is extracted from a source of true randomness (in this case, the authenticating server can retain a copy of the full OTP list for each client).

Once the OTP list has been generated and perhaps saved, notification can be sent from the password server 305, for example by the enrollment module 320 or the OTP generation module 330, to the user of the client device to inform the user of the availability of the OTP list. For example, the notification can comprise an email message, a Short Message Service (SMS) message, an Instant Message (IM), voice call, or other type of message sent to the client device 310 or another device or system associated with the user of the client device 310. Once notified, the user of the client device 310 can request the OTP list from the password server 305. For example, the request can be sent to the password server 305 in response to the user of the client device 310 accepting or acknowledging the notification received at the client device 310, by clicking a link embedded in the notification, by directing a web browser to a particular website, etc. either through the client device 310 or another device or system such as a personal computer etc. A packaging and delivery module 340 of the password server 305 can then retrieve the OTP list for the client device 310 from the OTP list records 335, package the OTP list for delivery, and download the packaged OTP list to the client device 310.

The client device 305 can comprise any of a number of different devices including a mobile telephone, a Personal Digital Assistant (PDA), a laptop or other personal computer, a smart card, or any other device. The client device 305 can include a processor, some persistent storage such as flash memory, and possibly an internal clock powered by a battery. Data storage such as flash memory (and hard drives) used in such devices have improved to be small in size, massive in capacity, and low in price. Up to now, OTP solutions have not taken advantage of the massive storage capacity currently available. Instead of using an algorithm to generate a sequence of OTPs from a seed and a small changing datum, embodiments of the present invention store a massive list 360 of pre-generated OTPs in the memory 355 on the client device 310. For example, 3 Megabytes of storage is sufficient to store a full year's worth of 6 decimal digit PINs that change every 30 seconds, thereby duplicating a typical time-based OTP device.

In this way, processing power requirements for the client device 310 are trivial since the application 350 of the client device is not generating the OTPs but instead selecting them from the locally stored list that was previously generated elsewhere, i.e., at the password server 305. Additionally, electrical power requirements of the client device 310 are minimal, or zero if the device is pure storage. Client software, i.e., the application 350 of the client device 310, is trivial or even optional/non-existent, reducing cost, especially if the OTP application runs on many different devices. Instead of pseudo-random OTP sequences that arise from seed-based algorithms, we can use truly random OTP sequences for enhanced security (though incurring some extra storage requirements at the server). Also, after a client is distributed, it can later support OTP algorithms that were not incorporated at distribution time.

As noted herein, embodiments of the invention provide systems and methods for the storage of OTPs on a device (principal) that needs to authenticate from time to time while utilizing recent availability of data storage capacity not previously exploited in this arena. Generally speaking, embodiments of the present invention include a password server that can generate and provide to a client device an OTP list containing a large number of OTPs but without the seed value for generating such passwords. For example, many different types of end devices that may utilize a OTP list generated under embodiments of the present invention typically handle files, including different types of multimedia files, of relatively large size and are capable of downloading or obtaining such files in a relatively short time. For example, many connections allow transfers in the 40 Mb/s range. In such cases, a media file such as an MP3 song file (approx. 5 MB) can be transferred in approximately one second, a video clip in different formats (approx. 35 MB) in roughly seven seconds, and a movie in different formats (approx. 800 MB) in about 3 minutes.

Thus, according to one embodiment, the size of the OTP list provided to a client can be based on a data size. Size of data (file stream or final amount) may be as large as, or larger than, the amount of data that users in other contexts acquire over networks, e.g., the aforementioned multimedia files. Additionally or alternatively, the size of the OTP list may be based on a data download time. That is, the amount of data in the OTP list can correspond to a download that takes an amount of time acceptable to a user, at typical high bandwidth network connection. For example, a download such as the media files mentioned above over a high-speed connection are typically considered acceptable, or at least not overly objectionable, to most users. Therefore, the size of the OTP list can be set to, or larger than, the size of a file that can be downloaded in the corresponding amount of time. In either case, i.e., measuring the size of the OTP in terms of data size or download time, the size of the OTP list can be determined based on the OTP client device, e.g., memory capacity thereof, and/or the connection(s) available to the OTP client device. Such information may be obtained and possibly maintained for a particular device, for example, by a manufacturer, seller, or provider, of the device or a user of the device registering the device and providing such information to the OTP server or other system accessible by the OTP server. In other cases, such information may be obtained by the OTP server querying or otherwise communicating with the device to solicit or measure such characteristics. Other embodiments are contemplated and considered to be within the scope of the present invention.

In another embodiment, the size of the OTP list may be measured in terms of the size sufficient for lifetime usage by the client device. Key material usually has a pre-determined lifetime, for security reasons. Devices have a limited life for other reasons too. Thus, one embodiment includes a OTP list data size sufficient to provide OTPs for at least as long as any generating device that will expire owing to: a) expiration of password validity period (e.g., 1-10 years); b) battery exhaustion of the device; c) mechanical failure (buttons wearing out, etc.). Note: this covers both event-based and time-based, even with fine time granularity.

To get an idea of the size of a sequence of pre-generated OTPs, consider that the EMV consortium uses a counter-based OTP system, where the counter is stored in a two byte datum on a chipcard (a credit card with a processor embedded). EMV documents explain that the counter can take 65536 different values, which allows the user to make 65536 purchases before the card needs to be replaced. This is considered adequate for most shoppers. A 6 digit decimal password can be represented in 3 bytes using "compact numeric" (cn) form favored by EMV. Since 65536×3=196608, this means that 65536 six digit OTP passwords can be stored in roughly 200 KB, a trivial amount of storage by today's standards. The cn format is suboptimal, and in fact less than 200 KB is needed.

Popular time-based OTP systems typically require a fresh OTP every 30 seconds (a window like this is used to accommodate clock drift between client and server). In one full year there are 365×24×60=525600 minutes. This corresponds to roughly 1 million 30 second intervals. Using cn form, we can thus store a full year's time-based OTPs in 3 Megabytes of data. Using a more efficient format, a 6 decimal digit password can be stored in 20 bits (less than 3 bytes), which means that our year-long supply of 1 million passwords can be stored in 2.5 Megabytes of data. It should be understood that, while the examples discussed herein include OTPs consisting of decimal digits, embodiments are applicable to strings of any symbols, and also binary authentication data. Regardless of the format, these calculations show that useful lists of pre-generated human-usable OTPs occupy sizes comparable to those of songs typically downloaded and stored in mp3 or other formats.

According to one embodiment, the client device 310 can comprise a mobile telephone. An application 350 is installed on the device 310. This application 350 can acquire OTP sequence data, i.e., the OTP list 360, select OTPs, e.g., using a counter or the current time. In the case of an OTP client that runs on mobile telephones, vendors can implement separate client applications in a variety of programming languages, and support hundreds of makes and models of devices. For example, BlackBerry requires changes to the application in order to run on the different OS versions that come with different services (Verizon, AT&T, etc.). This places a huge overhead burden on vendors. Since the solution disclosed here requires no OTP generation, the application is much simpler than for traditional systems.

As described, the OTP list may be generated and downloaded at one time. Additionally or alternatively, the OTP list can be continually downloaded and/or updated. For example, a device or user agent over the years, can download more OTPs at various opportunity where it is not hogging bandwidth and spoiling the user experience.

According to one embodiment and as noted above, users can enroll with the password server 305 as in a typical system requiring authentication. The user records 325 can contain the seed and possibly a counter, for each user. Previously, a user device would be provisioned with the seed. Instead, the password server 305 can generate the desired number of OTPs, and packages them for download by the user. Any standard method for providing a user with protected content can be used for this download. In this embodiment the client is an application 350 on a mobile telephone. The OTP list can be stored in a database 335, and an activation code can be emailed to the user. Later, the user can use her application 350 to contact the password server 305, enter her activation code, and download the OTP list 360 to the memory 355 of the mobile phone.

To use an OTP from the downloaded OTP list 360, the user experience is the same as for traditional OTP clients. The application 350 internally uses the counter, or the current time (retrieved from the host OS) to select the next OTP from the OTP list 360. In this way, the client application 350 can be very generic. The original application can provide a skeleton that is cognizant of a few concepts such as issuing organization name, display image, time-based, counter-based. Additionally, the client application 350 can support credentials from multiple issuers.

Suppose that after initial installation of the client application 350, an organization not previously involved in the initial deployment wants to use OTP authentication via mobile telephones. This may be a new need, or it may be that the organization has a legacy system using some OTP mechanism (possibly proprietary). The future user OTPs can now be generated and packaged (using for example a simple pre-defined XML format that presents basic information to the target client application). The client can download the new data and create a new Issuer credential. To support a new credential issuer, no changes are needed to the existing client, and no changes are need to a legacy server, apart from the pre-generation and download support.

In the case where an enterprise has already deployed an OTP solution that uses a proprietary or otherwise protected mechanism, a rival OTP solution vendor could not previously offer an alternative client solution that works with the existing server infrastructure. As a result, customers may be locked in to a product that they would like to replace. But with the pre-generated OTP method described here, the rival vendor may be able to utilize server-side generation of a suitable OTP list by proprietary and/or protected methods, but still usable by the rival client which does not need to implement any proprietary mechanisms.

Embodiments described above have focused on a mobile phone or other mobile device as the client device. However, as noted, embodiments of the present invention are not limited to any particular type of client device. For example, in another embodiment, the device can be a dedicated hardware device carried on a keychain, much like the RSA SecurID device. These simple devices can be provisioned with the OTP list before distribution to the end user. The present invention greatly reduces the complexity and power needs of such devices. In yet another embodiment, the device can comprise a storage device like a USB flash drive that lacks a processor, and a software application that runs on a personal computer. The executable software may reside on the flash drive or the computer. Other types of devices are contemplated and considered to be within the scope of the present invention.

Figure 4:
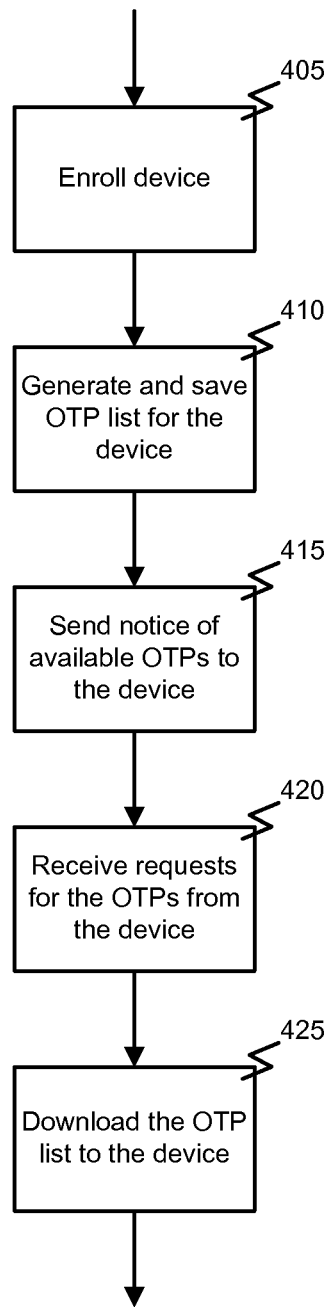
FIG. 4 is a flowchart illustrating a server process for utilizing pre-generated one-time passwords according to one embodiment of the present invention.

FIG. 4 is a flowchart illustrating a server process for utilizing pre-generated one-time passwords according to one embodiment of the present invention. In this example, processing can begin with enrolling 405 the device as described above. That is, through the client device, through another device, or in another manner, identifying user information and/or client device information can be collected and a user record can be generated and saved in one or more user records. Based on such user and/or client device information, a OTP list can be generated 410 for the client. This list can also be saved in an OTP list database as noted above. A notice can then be sent 415 to the client device indicating that the OTP list is available. For example and as noted above, such a notice can comprise an email, an SMS message, an automated voice call, or any other type of communication. Upon the client device accepting or acknowledging the notice, a request for the OTP list can be received 420 from the client. In response to the request, the OTP list for that client can be packaged and downloaded 425 to the requesting, enrolled client.

Figure 5:
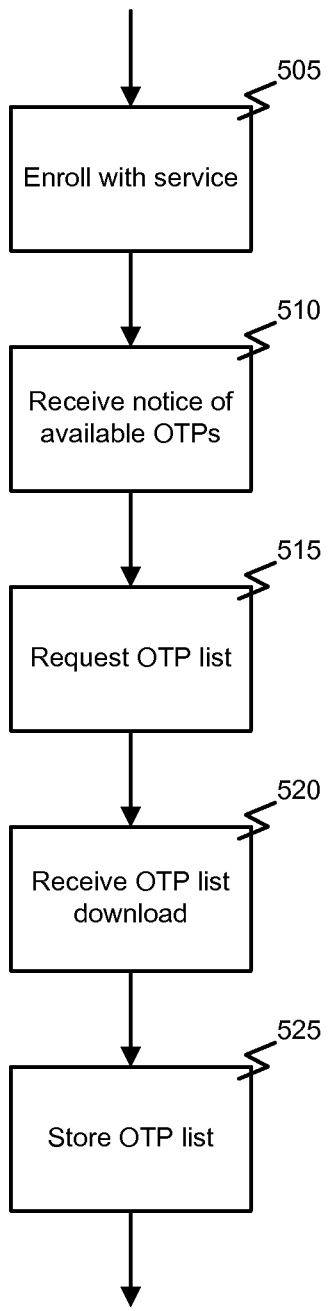
FIG. 5 is a flowchart illustrating a client process for utilizing pre-generated one-time passwords according to one embodiment of the present invention.

FIG. 5 is a flowchart illustrating a client process for utilizing pre-generated one-time passwords according to one embodiment of the present invention. In this example, processing can begin with the user of the client device enrolling 505 the device as described above, e.g., through the device, another device or system such as a personal computer, or through another means. Once enrolled and after the server has generated a OTP list for the device as described above, the client device can receive 510 a notification of the available OTP list. The client device can then request 515 the OTP list. For example, the request 515 can be sent in response to the user of the client device accepting or acknowledging the notification received 510 at the client device, by clicking a link embedded in the notification, by directing a web browser to a particular website, etc. either through the client device or another device or system such as a personal computer etc. The client device can then receive 520 the OTP list downloaded to the client device from the server in response to the request. Once received, the client device can unpack and save 525 the OTP list in memory for later use as OTPs are needed.

Under embodiments of the present invention, several megabytes of sensitive data can be stored on a consumer mobile telephone or other client device. Various possible approaches to securing this data can be considered under different embodiments. One approach may be to do nothing particular with regard to the OTP list stored on the client device. This is reasonable for some deployments. It makes the mobile telephone a one-factor solution: "something you have". Many devices such as iPhones and BlackBerries have password protection for using the device. Thus, in some implementations, this security may be considered sufficient to protect the OTP list on the client device. Depending on how serious the built-in protection is, this may give a two-factor solution, by adding "something you know".

Additionally, some devices like the BlackBerry have "protected memory" belonging to an application that requires a password from the application. In such cases, the OTP can be stored in protected memory. However, protected memory may be limited. In this case, a key (or equivalent) can be stored in protected memory and used by the client application to encrypt/decrypt the OTP list. Note that the OTPs could be encrypted at the server, and sent with the key, in order to reduce initialization complexity on the client application.

According to one embodiment, in lieu of protected memory, cryptographic camouflage may be used. One example of methods and systems for providing such cryptographic camouflage is U.S. Pat. No. 6,170,058 filed Dec. 23, 1997 by Kausik and entitled "Method and Apparatus for Cryptographically Camouflaged Cryptographic Key Storage, Certification, and Use" of which the entire disclosure is incorporated herein by reference for all purposes. In such cases the key for encrypting/decrypting the OTP list can be camouflaged by a PIN that the user must type in to the application. Using such camouflage and as described in the referenced applications, a wrong PINS will result in plausible resulting keys and OTPs, and so an attacker who has stolen the mobile telephone cannot mount a brute force attack. Thus, the attacker must try her OTPs against the server, and can be locked out after several failed attempts.

One such implementation will now describe in more detail with reference to FIG. 3. Suppose that the OTP list 360 is a sequence of one million OTPs stored contiguously. A counter, initially zero, is stored also. The application 350 accepts a user PIN, and uses this PIN combined with the counter as the input seed to the mask-generation function MGF1 function of IETF RFC 2437. The MGF1 output is used to mask and unmask the OTP corresponding to the counter used. Initially, all of the one million OTPs are masked by iterating the counter through all possible values. This initialization may be done on the server 305 or the client 310. When used, the appropriate OTP is unmasked. This amounts to camouflaging the OTP values, as an attacker who has stolen the device will observe plausible candidate OTPs for every trial PIN.

If OTP values are from a limited character set, as are decimal digit strings, a naive masking/unmasking will produce unmasked OTPs as non-decimal strings, for a wrong trial PIN. This would leak information to an attacker. There are techniques well-known to those skilled in the art to deal with such mappings between different sized data sets so as to preserve acceptable statistical properties. These include Format Preserving Encryption, and the use of extra computation to reduce statistical anomalies resulting from conversion of numbers to representations in different bases.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for utilizing pre-generated one-time passwords, the system comprising:
   a password server executing one or more applications which cause the password server to generate a list of One-Time Passwords (OTPs) comprising multiple OTPs and package the list of OTPs for delivery; and a client device, the client device comprising a processor and a memory, wherein the password server downloads the list of OTPs to the client device in response to a request, and wherein the client device saves the downloaded list of OTPs to the memory of the client device for use in accessing a resource requiring authentication, wherein the client device comprises a client application stored in the memory of the client device, and the client application, when executed by the processor, causes the processor to select one of the OTPs from the list of OTPs in the memory of the client device for use in accessing the resource requiring authentication, the client application causes the processor to access user input being a trial PIN and a counter, the counter having a unique value for each OTP on the list of OTPs, the client application causes the processor to combine the trial PIN and the counter as an input seed to a mask generation function, the processor uses an output of the mask generation function to unmask the selected OTP that corresponds to the counter, the unmasking provides a plausible candidate OTP for every trial PIN that is input and provides a correct OTP when the trial PIN matches a user PIN that was used to mask the list of OTPs.

2. The system of claim 1, wherein the client device comprises a mobile phone, a fob device, or a smart card.

3. The system of claim 1, wherein the client device comprises a removable memory device.

4. The system of claim 3, wherein the client device further comprises a computer system adapted to read the client application from the removable memory device and execute the client application.

5. The system of claim 1, wherein packaging the list of OTPs comprises encrypting the list of OTPs.

6. The system of claim 5, wherein encrypting the list of OTPs comprises cryptographically camouflaging the list of OTPs, the cryptographically camouflaging comprises:
   accessing a counter;
   accessing the user PIN; and
   iteratively incrementing the counter, combining the incremented counter with the user PIN, and using the combined counter and user PIN to mask the OTP corresponding to the counter.

7. The system of claim 1, wherein a size of the list of OTPs is based on a size of a media file for the client device.

8. The system of claim 7, wherein the media file comprises an audio file and/or a video file.

9. The system of claim 1, wherein the size of the list of OTPs is at least 5 megabytes.

10. The system of claim 1, wherein the size of the list of OTPs is at least 35 megabytes.

11. The system of claim 1, wherein the size of the list of OTPs is at least 800 megabytes.

12. The system of claim 1, wherein the size of the list of OTPs depends upon an available memory of the client device.

13. The system of claim 1, wherein the size of the list of OTPs depends upon a speed of a network connection of the client device.

14. The system of claim 13, wherein the size of the list of OTPs further depends upon a predetermined amount of time needed to download the list of OTPs at the speed of the network connection.

15. The system of claim 1, wherein the client device utilizes a different password every 30 seconds and the size of the list of OTPs is sufficient to store enough passwords for a predetermined number of years.

16. A method of generating and providing One-Time Passwords (OTPs), the method comprising:
   enrolling a client device with a password server;
   generating, by the password server, a list of One-Time Passwords (OTPs);
   accessing a counter, the counter having a unique value for each OTP on the list of OTPs;
   accessing a user PIN associated with the client device;
   iteratively incrementing the counter, combining the incremented counter with the user PIN, and using the combined counter and user PIN to mask the OTP corresponding to the counter;
   saving a list of the masked OTPs by the password server;
   receiving at the password server a request for OTPs from the client device;
   providing the list of the masked OTPs from the password server to the client device;
   the client device receiving a trial PIN from a user and accessing a counter, the client device combining the trial PIN and the counter to unmask an OTP from the list of the masked OTPs that corresponds to the counter, the unmasking provides a plausible candidate OTP for every trial PIN and provides a correct OTP when the trial PIN matches the user PIN that was used to mask the list of OTPs; and
   the client device providing the correct OTP to the password server to gain access to a resource.

17. A machine-readable memory having stored thereon a sequence of instructions which, when executed by a processor, cause the processor to generate and provide One-Time Passwords (OTPs), comprising causing the processor to:
   enroll a client device at a server;
   generate a list of One-Time Passwords (OTPs), wherein the size of the list of OTPs depends on a size of an available memory of the client device;
   access a counter, the counter having a unique value for each OTP on the list;
   access a user PIN associated with the client device;
   iteratively increment the counter, combine the incremented counter with the user PIN, and use the combined counter and user PIN to mask the OTP on the list corresponding to the counter;
   save a list of the masked OTPs;
   receive a request for OTPs from the client device;
   provide the list of masked OTPs to the client device over a network connection in response to the request;
   receive a trial PIN at the client device from a user;
   access a counter at the client device;
   combine the trial PIN and the counter at the client device to unmask an OTP from the list of the masked OTPs that corresponds to the counter, the unmasking provides a plausible candidate OTP for every trial PIN and provides a correct OTP when the trial PIN matches the user PIN that was used to mask the list of OTPs; and
   provide, by the client device, the correct OTP to the server to gain access to a resource.

18. The system of claim 1, wherein the list of the OTPs is a first list, the password server generates a second list of OTPs using a sequence of future time values and packages the second list of OTPs for delivery, the client device downloads the second list to the memory of the client device, the client application causes the processor to select one of the OTPs from the second list of OTPs in the memory of the client device based on the current time.

19. The system of claim 18, wherein the one of the OTPs is selected from the second list of OTPs in the memory of the client device using a mapping between the current time and the second list of OTPs.

20. The system of claim 18, wherein the one of the OTPs is selected from the second list of OTPs in the memory of the client device using an offset calculation based on the elapsed time since an agreed starting point.

21. The system of claim 1, further comprising:
locking out the client device from further attempts to access the resource in response to receiving more than a predetermined number of incorrect OTPs from the client device.

22. The system of claim 1, wherein the client application supports credentials from multiple issuers of OTPs, the password server is for a first issuer of OTPs, the list of OTPs is a first list of OTPs, further comprising the client device downloading a second list of OTPs from a second issuer of OTPs, the client application creates a new issuer credential for the second issuer.

23. The machine-readable memory of claim 17, wherein the size of the list of OTPs further depends on a period of time for which the OTPs are valid.

24. The machine-readable memory of claim 17, wherein the size of the list of OTPs further is sufficient to last until at least an expected mechanical failure of the client device.

25. A client device, comprising:

a processor; and memory coupled to the processor, the memory stores a client application, the processor receives a list of One-Time Passwords (OTPs) from a server in response to a request from the client device;

the processor saves the list of OTPs to the memory;

the processor executes the application to select one of the OTPs from the list of OTPs, to access user input that includes a trial PIN, to access a counter, the counter having a unique value for each OTP on the list of OTPs, to combine the trial PIN and the counter as an input seed to a mask generation function, the processor uses an output of the mask generation function to unmask the selected OTP that corresponds to the counter, the unmasking provides a plausible candidate OTP for every trial PIN that is input and provides a correct OTP when the trial PIN matches a user PIN that was used to mask the list of OTPs; and the processor provides the correct OTP to the server to gain access to a resource.

* * * * *